(12) United States Patent
Hosokawa et al.

(10) Patent No.: US 6,317,202 B1
(45) Date of Patent: Nov. 13, 2001

(54) AUTOMOTIVE RADAR DETECTING LANE MARK AND FRONTAL OBSTACLE

(75) Inventors: Toshio Hosokawa, Kariya; Takekazu Terui, Tokai, both of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/438,398

(22) Filed: Nov. 12, 1999

(30) Foreign Application Priority Data

Nov. 12, 1998 (JP) .................................................. 10-322234

(51) Int. Cl.[7] .............................. G01B 11/26; G01C 3/08; B60T 7/16
(52) U.S. Cl. .................... 356/141.1; 356/4.01; 356/5.01; 180/167; 180/169
(58) Field of Search ................................. 356/4.01, 141.1, 356/5.01–5.15; 180/169, 167

(56) References Cited

U.S. PATENT DOCUMENTS

| 4,566,032 | * | 1/1986 | Hirooka et al. . |
| 4,849,731 | * | 7/1989 | Melocik . |
| 4,996,468 | * | 2/1991 | Field et al. . |
| 5,793,491 | * | 8/1998 | Wangler et al. . |
| 5,864,391 | | 1/1999 | Hosokawa et al. ............... 356/4.01 |
| 5,896,190 | * | 4/1999 | Wangler et al. ................... 356/4.01 |
| 6,055,042 | * | 4/2000 | Sarangapani ...................... 356/4.01 |

FOREIGN PATENT DOCUMENTS

| 7-287069 | 10/1995 | (JP) . |
| 8-248133 | 9/1996 | (JP) . |
| 9-274076 | 10/1997 | (JP) . |

* cited by examiner

Primary Examiner—Stephen C. Buczinski
(74) Attorney, Agent, or Firm—Pillsbury Winthrop LLP

(57) ABSTRACT

A radar apparatus for automotive vehicles is provided which is designed to emit laser beams to scan a forward zone for detecting moving object such as preceding vehicles and a downward zone for detecting lane marks printed on a road surface for defining a traffic lane. The downward zone is wider than the forward zone horizontally. Each zone has a minimum width required for assuring desired accuracy of radar detection of an object, thereby minimizing the number of emissions of the laser beams, resulting in an increase in lifetime of a laser diode and production of unwanted data on roadside objects having a low probability that the vehicle will collide them. The apparatus also includes a light focusing mechanism which focuses the laser beam on a given area in the downward zone to increase the power density of a return of the laser beam.

12 Claims, 13 Drawing Sheets

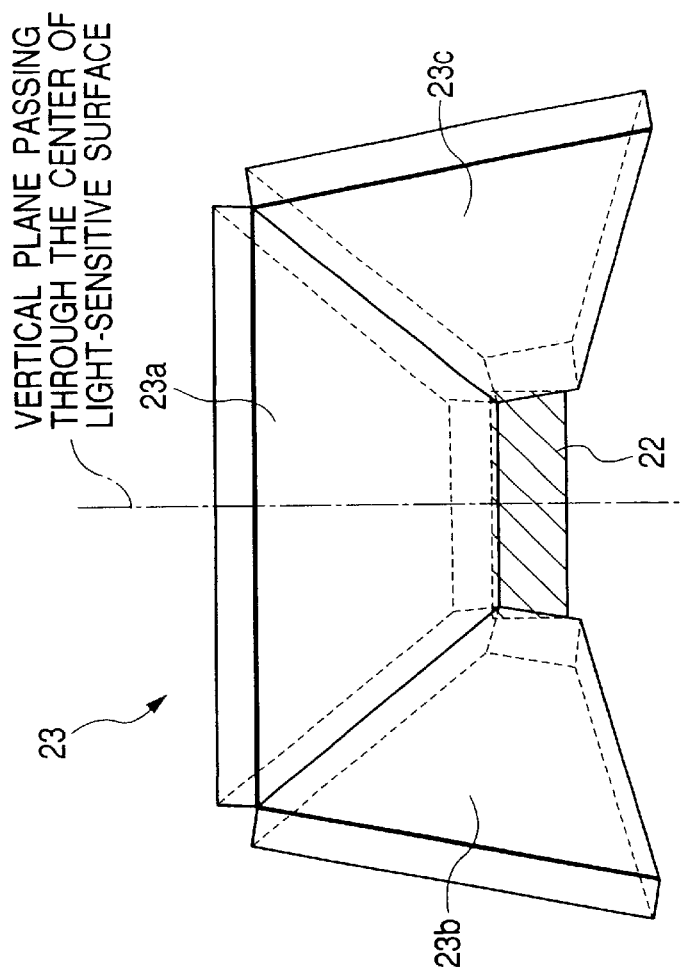
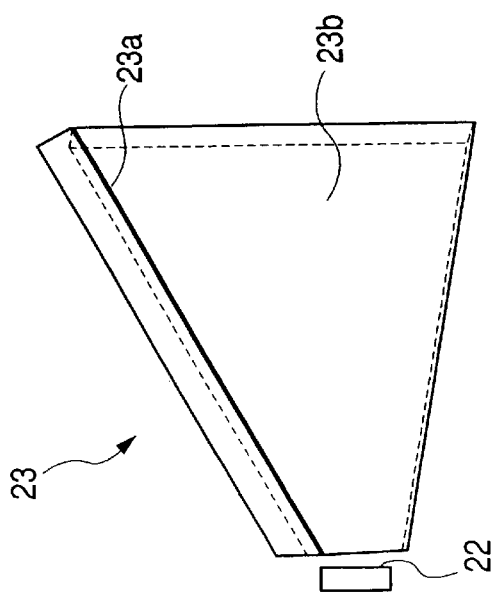
FIG. 5(a)
FIG. 5(b)

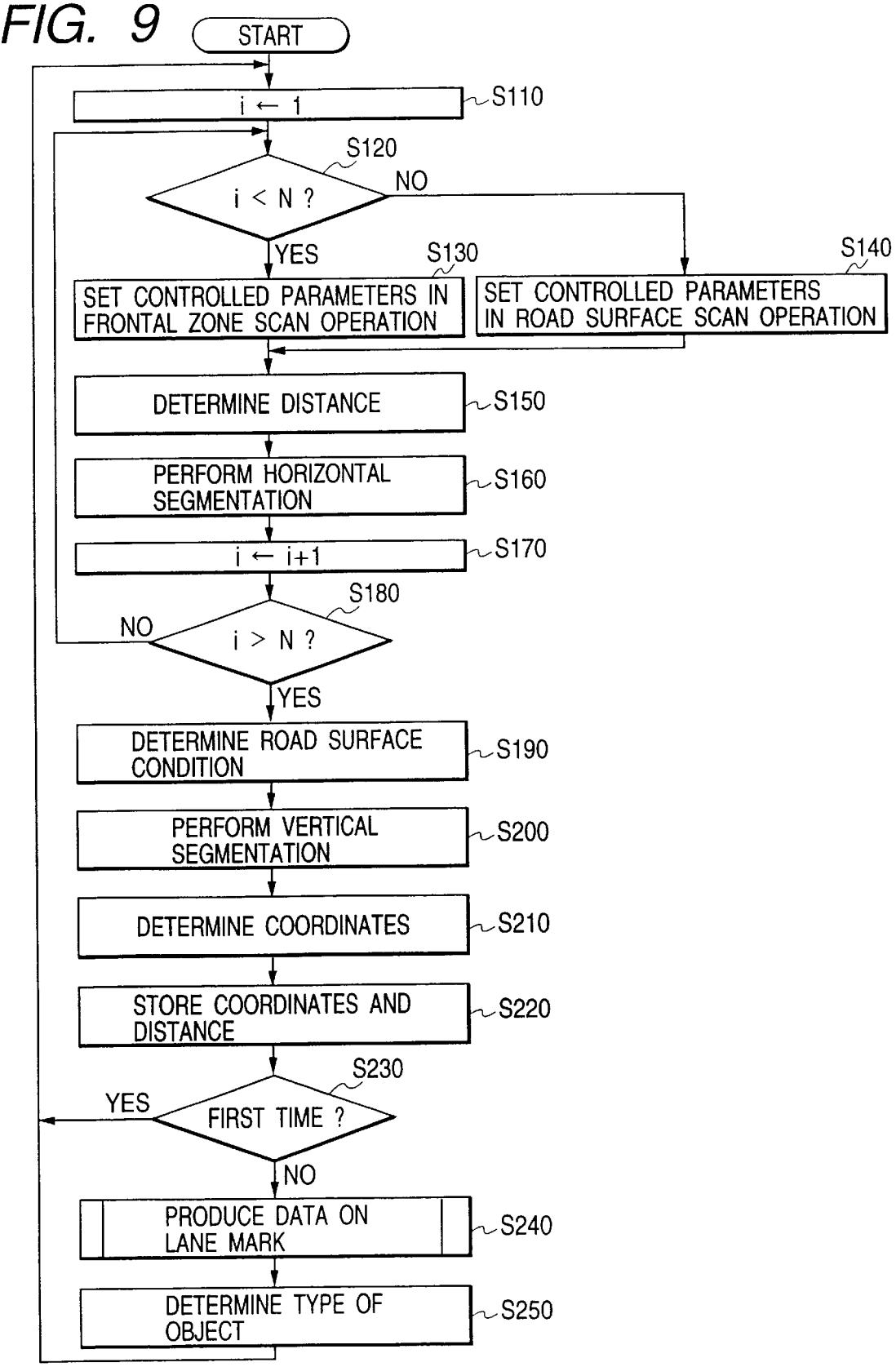

AUTOMOTIVE RADAR DETECTING LANE MARK AND FRONTAL OBSTACLE

BACKGROUND OF THE INVENTION

1. Technical Field of the Invention

The present invention relates generally to an automotive radar system designed to emit a beam of light over a frontal scanning area to gather data used in identifying obstacles existing ahead of an automotive vehicle, and more particularly to an automotive radar system for detecting lane marks printed on a road surface and another obstacle present in front of the vehicle.

2. Background Art

In recent years, automotive radar systems are used in anti-collision systems which detect preceding vehicles and other obstacles existing on a road and white lane marks printed on the road surface and alert a vehicle operator when the vehicle is in close proximity to the obstacle or when the vehicle is going to run out of the lane mark or in automatic cruise control systems which keep the distance to the preceding vehicle constant between the right and left lane marks.

In such radar systems, detection of obstacles located at a distance of approximately 100 m requires sweeping a radar beam horizontally within a frontal zone, while detection of lane marks requires sweeping a radar beam downward to scan the road surface.

Japanese Patent First Publication No. 8-248133 discloses an automotive radar system designed to sweep radar beams both horizontally for detecting obstacles in a frontal zone, which will also be referred to as a frontal zone scanning operation below) and downward for detecting lane marks, which will also be referred to as a road surface scanning operation below). The frontal zone scanning operation and the road surface scanning operation are achieved simultaneously by splitting a single beam of light into a plurality of radar beams, directing them to a moving mirror at different vertical angles through respective reflecting mirrors, and sweeping the radar beams horizontally.

Usually, a scan beam emitted from a radar mounted on an automotive, as clearly shown in FIG. 14($a$1), intersects each lane mark printed on one of sides of a road diagonally, so that an area of the lane mark to which the scan beam is irradiated is relatively small. Additionally, the smaller the incident angle $\psi$ of the scan beam to the road surface is, as shown in FIG. 14($a$2), the greater will be an area S irradiated by the scan beam, which will cause the density of power of the scan beam on the road surface to be decreased greatly. Further, the reflectivity of lane marks is usually low as compared with reflectors mounted on typical automotive vehicles. It is, therefore, difficult for typical radar systems to detect a return of a scan beam from a distant road surface.

The above problems may be alleviated by emitting a scan beam at a great angle to the road surface so as to decrease the area S for increasing the density of power of the scan beam. This, however, requires emission of the scan beam in the vicinity of the vehicle, thereby resulting in an increase in scan angle for detecting the lane marks accurately. The increase in scan angle without reducing the resolving power of the azimuth angle of a target requires a large number of times beams are generated for each scan, thereby resulting in an increase in load of a scan beam source (e.g., laser diodes), leading to an decrease in lifetime of the scan beam source.

Further, in the above radar system designed to perform both the frontal zone scanning operation and the road surface scanning operation, the increase in angle of a scan of the road surface will also cause the angle of a scan of the frontal zone to be increased, thus resulting in undesirable detection of many safe obstacles on the sides of the road. This leads to complex signal processing for identifying target objects and an increase in operations therefor.

The sensitivity of the radar system to the lane marks may be increased by increasing the power of the scan beam source, but it will cause the lifetime of the scan beam power to be decreased greatly.

SUMMARY OF THE INVENTION

It is therefore a principal object of the present invention to avoid the disadvantages of the prior art.

It is another object of the present invention to provide a beam scanning radar system for automotive vehicles capable of detecting lane marks printed on a road surface and another obstacle present in front of the vehicle accurately without decreasing the lifetime of a beam source of the radar system.

According to one aspect of the invention, there is provided a radar apparatus for a vehicle which comprises: (a) a beam source mounted in the vehicle, emitting a beam of light; (b) a first scanning mechanism directing the beam from the beam source forward of the vehicle so as to scan a first scanning area extending horizontally over a first angular range; (c) a second scanning mechanism directing the beam from the beam source forward of the vehicle so as to scan a second scanning area extending on a road surface horizontally over a second angular range which is greater than the first angular range; and (d) a light receiving mechanism receiving a return of the beam of light directed by the first scanning mechanism to detect an object present in the first scanning area and a return of the beam of light directed by the second scanning mechanism to detect a lane mark printed on the road surface to define a traffic lane.

In the preferred mode of the invention, a rotary mirror is further provided which is rotated to change a direction of the beam of light from the beam source so as to scan the first and second scanning areas selectively. The rotary mirror has a plurality of mirror surfaces which are arranged around a periphery of the rotary mirror and which are inclined at different angles to an axis of rotation of the rotary mirror. The second scanning mechanism includes at least one of the mirror surfaces, while the first scanning mechanism includes the other mirror surfaces.

The light receiving mechanism includes a light sensitive surface and an upper mirror. The light sensitive surface is responsive to input of the return of the beam of light to produce a signal indicative thereof. The upper mirror is designed to direct light traveling from a lower side of a traveling direction of the vehicle to the light sensitive surface.

The light receiving mechanism also includes a side mirror which is designed to direct light falling thereon from a lateral direction traversing the traveling direction of the vehicle to the light sensitive surface.

The side mirror is so arranged that a mirror surface faces downward.

According to another aspect of the invention, there is provided a radar apparatus for a vehicle which comprises: (a) a beam source mounted in the vehicle, emitting a beam of light; (b) a first scanning mechanism directing the beam from the beam source forward of the vehicle so as to scan a first scanning area extending horizontally over a first angular range; (c) a second scanning mechanism directing the beam from the beam source forward of the vehicle so as to scan a second scanning area extending on a road surface horizontally over a second angular range; (d) a light receiving mechanism receiving a return of the beam of light directed by the first scanning mechanism to detect an object present in the first scanning area and a return of the beam of light directed by the second scanning mechanism to detect a lane mark printed on the road surface to define a traffic lane; and (e) a light focusing mechanism provided in the second scanning mechanism, the light focusing mechanism focusing the beam of light on a given portion in the second scanning area.

In the preferred mode of the invention, the light focusing mechanism includes a concave mirror which directs the beam emitted from the beam source so as to scan the second scanning area.

The second angular range is greater than the first angular range.

A rotary mirror is further provided which is rotated to change a direction of the beam of light from the beam source so as to scan the first and second scanning areas selectively. The rotary mirror has a plurality of mirror surfaces which are arranged around a periphery of the rotary mirror and which are inclined at different angles to an axis of rotation of the rotary mirror. The second scanning mechanism includes at least one of the mirror surfaces, while the first scanning mechanism includes the other mirror surfaces.

The light receiving mechanism includes a light sensitive surface and an upper mirror. The light sensitive surface is responsive to input of the return of the beam of light to produce a signal indicative thereof. The upper mirror is designed to direct light traveling from a lower side of a traveling direction of the vehicle to the light sensitive surface.

The light receiving mechanism also includes a side mirror which is designed to direct light falling thereon from a lateral direction traversing the traveling direction of the vehicle to the light sensitive surface.

The side mirror is so arranged that a mirror surface faces downward.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5(a) is a front view which shows a light-receiving mirror assembly;

FIG. 5(b) is a side view which shows a light-receiving mirror assembly;

FIG. 9 is a flowchart of a program performed to detect an obstacle present ahead of a vehicle and a lane mark printed on a road surface;

FIGS. 14(b1) and 14(b2) are illustrations which show a scan beam reflected to a road surface from a concave mirror surface of a polygon mirror mounted in a radar of the invention.

DESCRIPTION OF THE PREFERRED EMBODIMENTS

Figure 1:
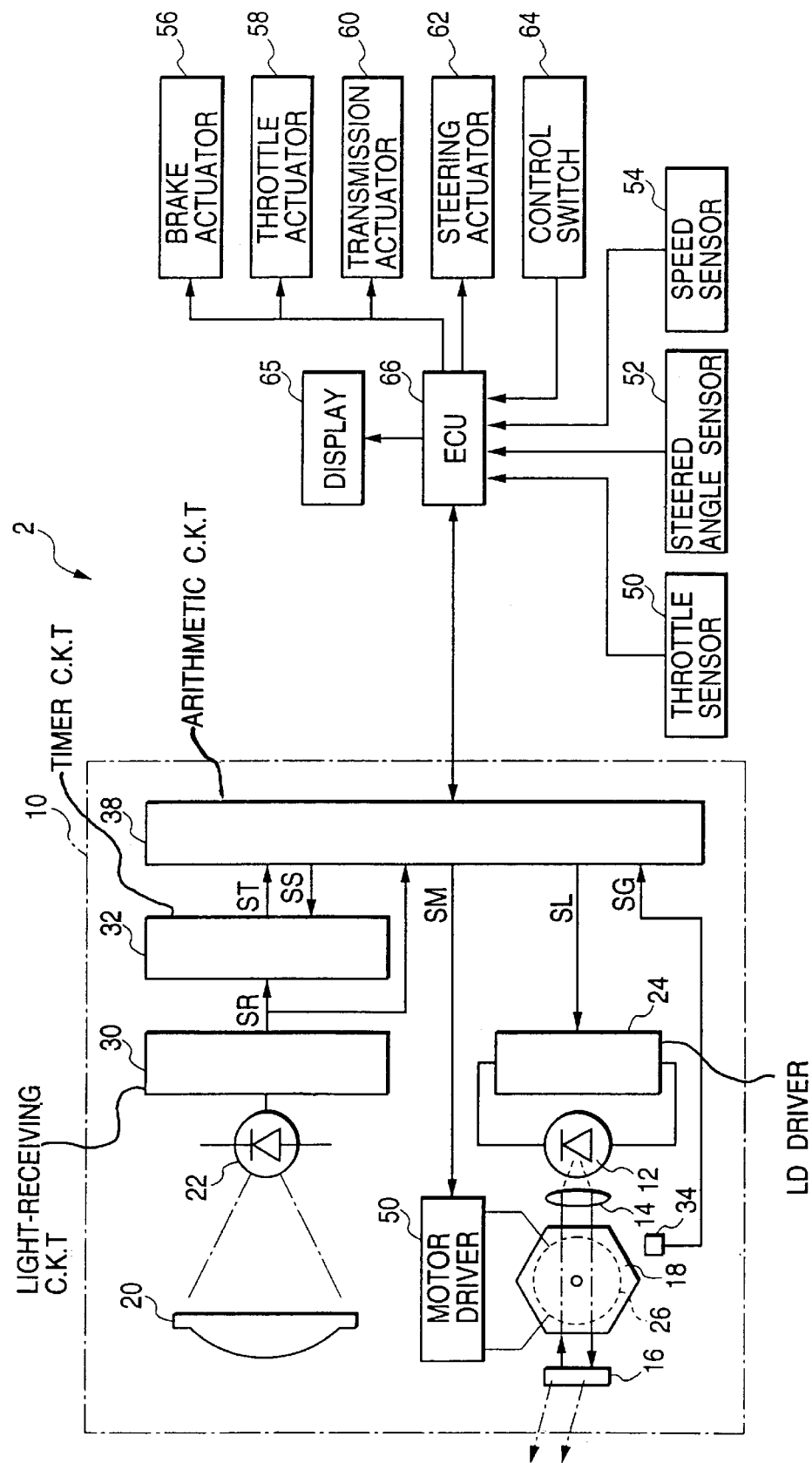
FIG. 1 is a block diagram which shows a laser radar system of the invention used in an automatic cruise control system for automotive vehicles.

Referring now to the drawings, wherein like numbers refer to like parts in several views, particularly to FIG. 1, there is shown a laser radar system according to the present invention which is, as one example, used in an automatic cruise control system for automotive vehicles.

The automatic cruise control system 2 includes a laser radar 10, a throttle sensor 50, a steered angle sensor 52, a vehicle speed sensor 54, a brake actuator 56, a throttle actuator 58, an automatic transmission actuator 60, a steering actuator 62, a control switch 64, a display 65, an electronic control unit (ECU) 66.

The laser radar 10 is designed to emit laser beams in the form of pulse signals to scan a frontal zone of a vehicle and receive returns of the laser beams to detect obstacles such as preceding vehicles and stationary objects located on the sides of a road and lane marks printed on the road surface defining a traffic lane visually. The throttle sensor 50 monitors the degree of an opening of a throttle valve which regulates the quantity of intake air of an internal combustion engine. The steered angle sensor 52 monitors a steered angle of a steering wheel. The vehicle speed sensor 54 monitors the speed of the vehicle. The brake actuator 56 actuates a brake of the vehicle regardless of a brake pedal effort of a vehicle operator. The throttle actuator 58 selectively opens and closes the throttle valve regardless of an acceleration pedal effort of the vehicle operator. The automatic transmission actuator 60 controls an automatic transmission regardless of a manual operation of a shift lever. The steering actuator 62 regulates a steered angle of the steering wheel regardless of a manual steering operation of the vehicle operator. The control switch 64 is used to input a variety of command signals to the ECU 66. The display 65 displays conditions of various controls and running conditions of the vehicle. The ECU 66 is made of a microcomputer and receives signals from the throttle sensor 50, the steered angle sensor 52, the vehicle speed sensor 54, and the control switch 64 to control the actuators 56, 58, 60, and 62 so that the vehicle may travel at a constant interval between itself and a preceding vehicle without going out of the lane marks.

Figure 2:
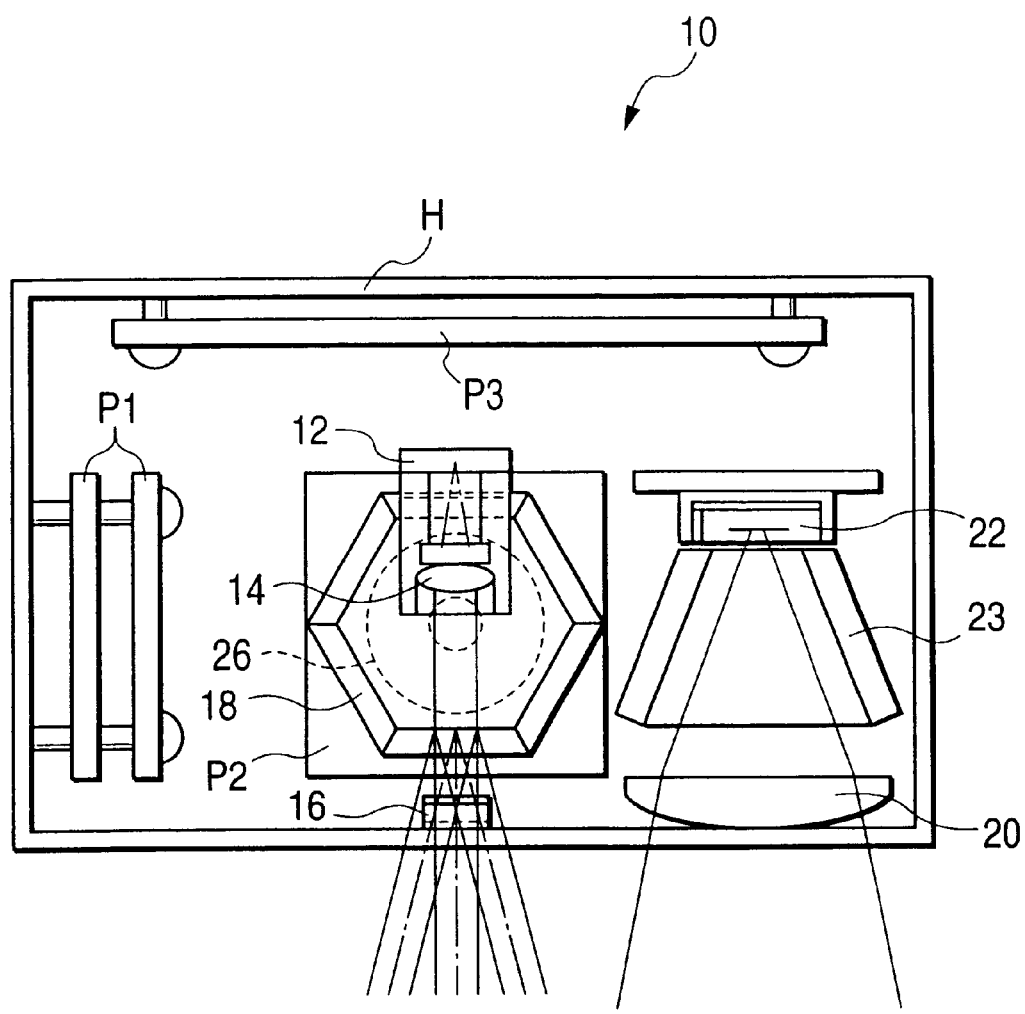
FIG. 2 is a plan view which shows an optical system of a laser radar.

The laser radar 10 has, as shown in FIGS. 1 and 2, an optical system consisting of a laser diode (LD) 12, a collimating lens 14, a mirror 16, a polygon mirror 18, a light-receiving lens 20, a photodiode (PD) 22, and a light-receiving mirror assembly 23. The laser diode 12 converts an electrical signal into an infrared laser beam and emits it to the collimator lens 14. The collimator lens 14 converts the inputted laser beam into a parallel beam. The mirror 16 reflects thereon the parallel beam emerging from the collimator lens 14 in a given direction. The polygon mirror 18 is turned to direct the parallel beam reflected from the mirror 16 to a direction changing continuously. The light-receiving lens 20 gathers incoming light and directs it to the photodiode 22 through the light-receiving mirror assembly 23. The photodiode 22 converts the light falling thereon into an electrical signal.

Figure 3A:
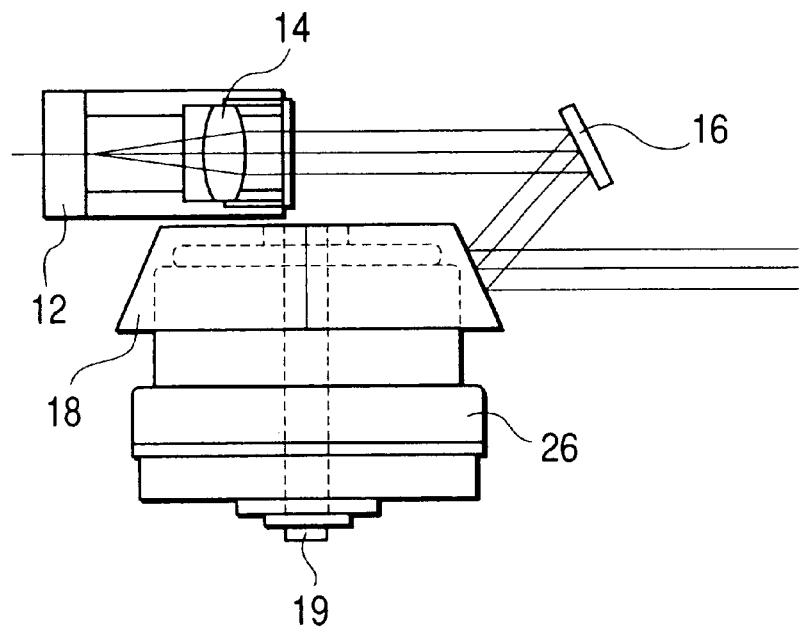
FIG. 3(a) is a side view which shows a polygon mirror.
Figure 3B:
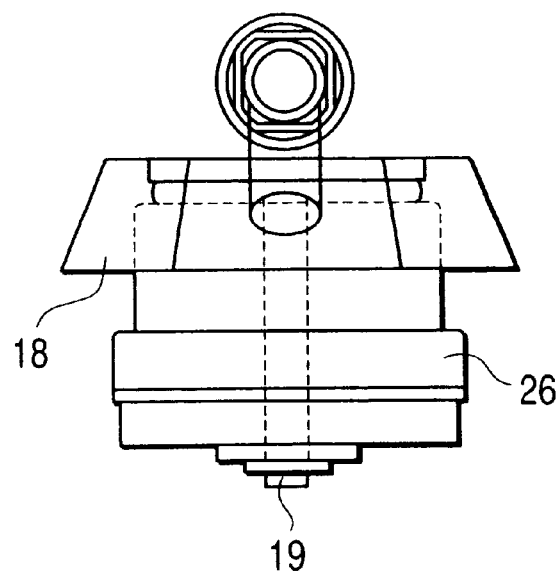
FIG. 3(b) is a front view which shows a polygon mirror.
Figure 4A:
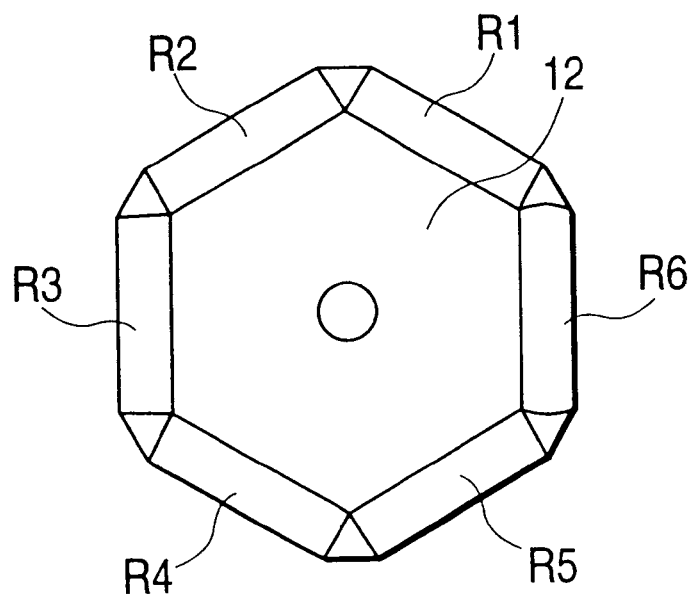
FIG. 4(a) is a plan view which shows mirror surfaces of a polygon mirror.
Figure 4B:
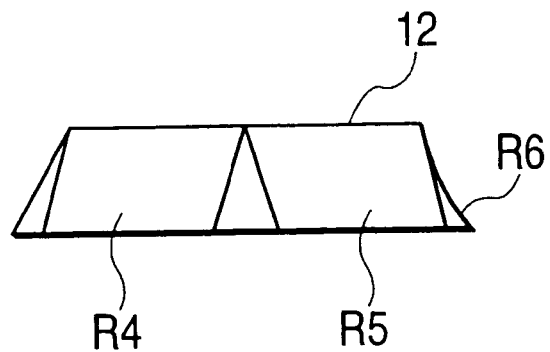
FIG. 4(b) is a side view which shows mirror surfaces of a polygon mirror.

The polygon mirror 18, as shown in FIGS. 4(a) and 4(b), has six reflective surfaces R1, R2, R3, R4, R5, and, R6 disposed around the periphery thereof. The six reflective surfaces R1, R2, R3, R4, R5, and, R6 are inclined to a support shaft 19 (i.e., an axis of rotation), as shown in FIGS. 3(a) and 3(b), of the polygon mirror 18 at angles different from each.

The laser beam emitted from the LD 12 is, as described above, converted into a parallel beam through the collimating lens 14 and then falls, as clearly shown in FIG. 3(a), on one of the reflective surfaces R1 to R6 of the polygon mirror 18 through the mirror 16. The polygon mirror 18 is rotated so as to sweep the laser beam horizontally according to rotation thereof and shift it vertically each time one of the reflective surfaces R1 to R6 on which the laser beam falls is changed according to the rotation of the polygon mirror 18.

Figure 14:
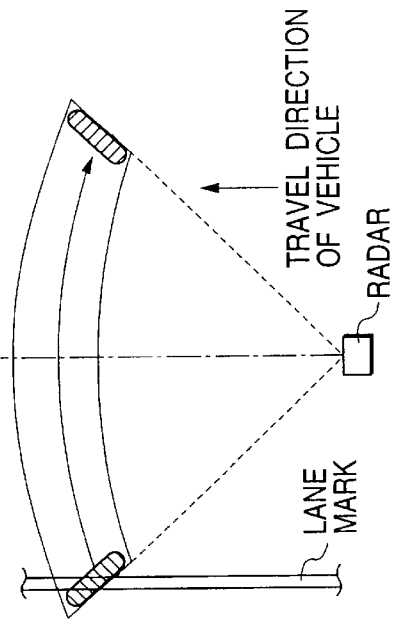
FIGS. 14(a1) and 14(a2) are illustrations which show a scan beam emitted from a conventional radar mounted on an automotive.
Figure 14:
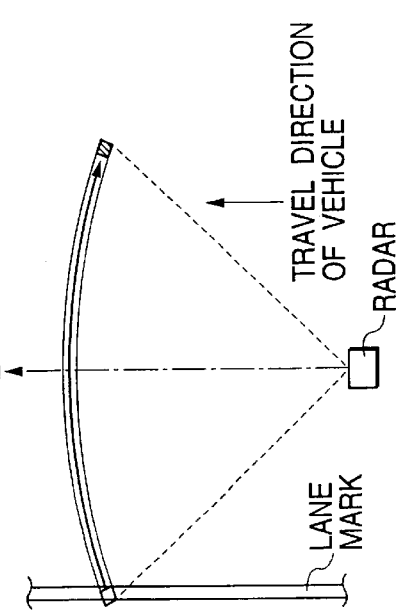
Figure 14:
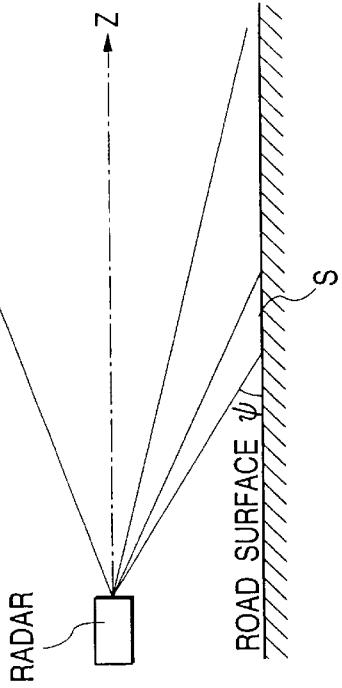
Figure 14:
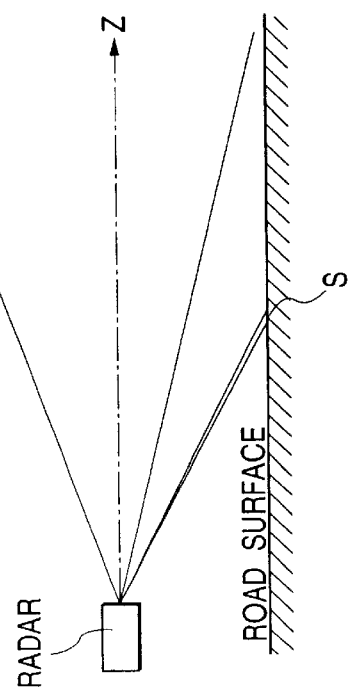

Five of the six reflective mirrors, i.e., the reflective mirrors R1 to R5, which will also be referred to as frontal zone scanning mirror surfaces below, are inclined at regular angular intervals to the support shaft 19. In this embodiment, if a horizontal direction is defined as zero (0°), the reflective mirrors R1 to R5 are oriented optically so that the laser beam falling on the polygon mirror 18 is radiated in sequence in angular directions of 0°, ±1°, and ±2°. The remaining one of the reflective mirrors, i.e., the reflective mirror R6, which will also be referred to as the road scanning mirror surface below, is inclined at an angle different from those of the frontal zone scanning mirror surfaces R1 to R5 so that the laser beam reflected therefrom may reach a frontal area of the road surface spaced at a given distance (approximately 10 m in this embodiment) from the vehicle equipped with the laser radar 10, which will be referred to as a system vehicle below. The road scanning mirror surface R6, as clearly shown in FIG. 4(b), is of a concave shape and has the focal length substantially identical with or greater than the distance between the system vehicle and the laser beam-irradiated area of the road surface. Specifically, the road scanning mirror surface R6 focuses a laser beam on a smaller area S of the road surface, as shown in FIGS. 14(b1) and 14(b2), thereby resulting in a great increase in density of power of the laser beam on the road surface.

The light-receiving mirror assembly 23, as clearly shown in FIGS. 5(a) and 5(b), consists of an upper mirror 23a and side mirrors 23b and 23c which expand in the form of a horn from the photodiode 22 to the light-receiving lens 20. The side mirrors 23b and 23c also expand downward, as viewed in FIG. 5(a), from the upper mirror 23a.

Figure 6A:
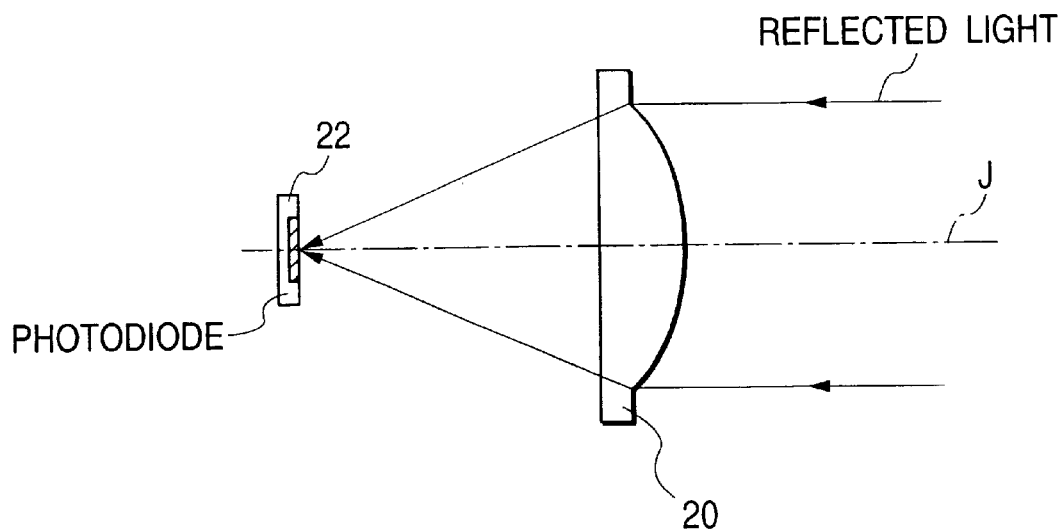
FIG. 6(a) is an illustration which shows a path of light traveling from a forward direction, falling on a photodiode through a light-receiving lens.
Figure 6B:
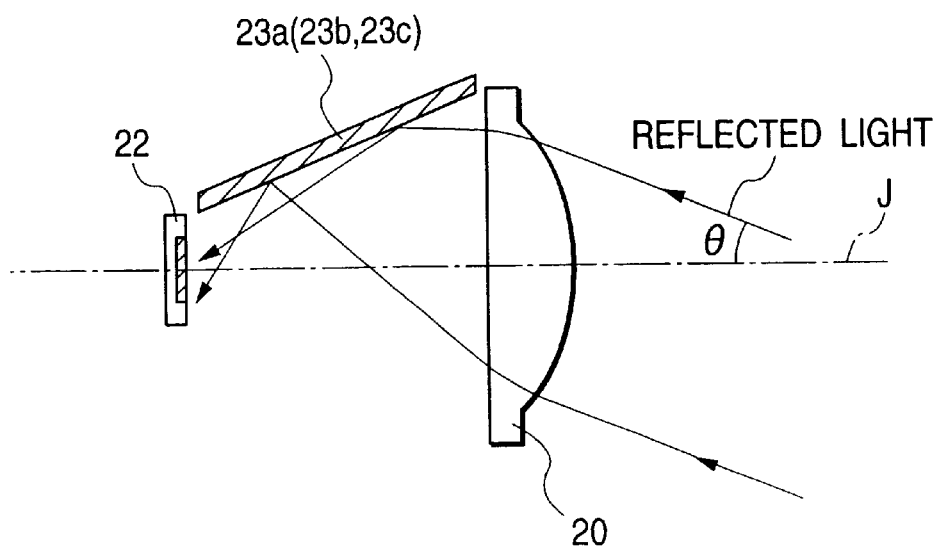
FIG. 6(b) is an illustration which shows a path of light traveling from a lower direction, falling on a photodiode through a light-receiving lens.

Light, which is reflected from, for example, a preceding vehicle present in a forward radar-detectable zone and which makes a relatively small angle with the optical center line J, as shown in FIG. 6(a), extending through the center of the photodiode 22 and the center of the light-receiving lens 20, is focused by the light-receiving lens directly on a light-sensitive surface of the photodiode 22. On the other hand, light which is reflected from the road surface and enters the light-receiving lens 20, as shown in FIG. 6(b), from a downward direction at a relatively great angle $\theta$ to the optical center line J, is reflected on the upper mirror 23a and directed to the light-sensitive surface of the photodiode 22. Similarly, light which is reflected from a lateral direction (i.e., either side of the frontal scanning zone) and enters the light-receiving lens 20 at a relatively great angle $\theta$ to the optical center line J, is reflected on one of side mirrors 23b and 23c and directed to the light-sensitive surface of the photodiode 22.

Figure 7A:
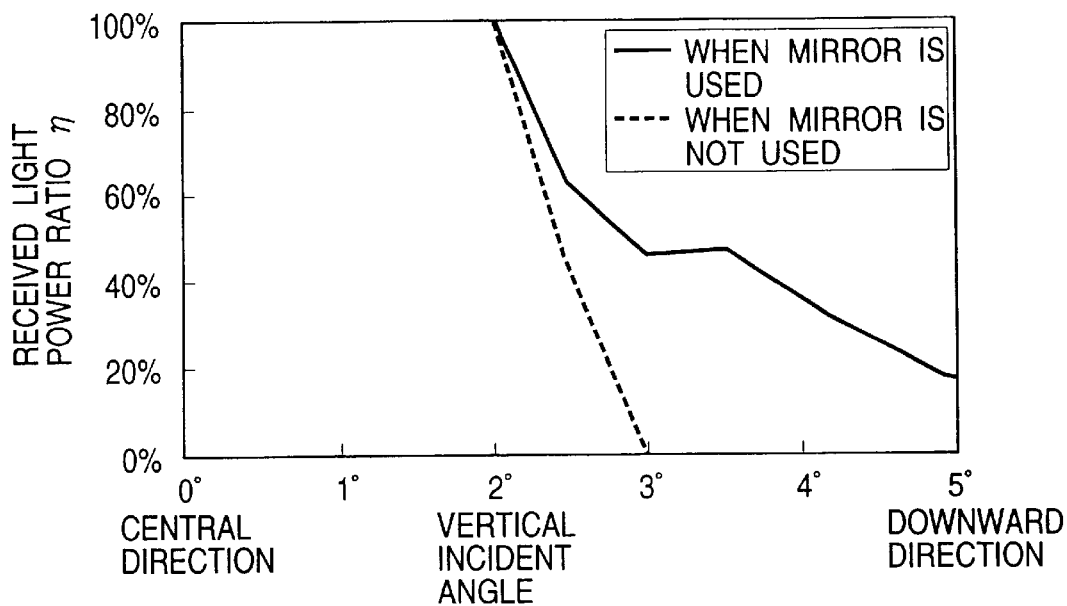
FIG. 7(a) illustrates for the case where the light enters a light-receiving lens at different angles in a vertical direction and falls on an upper mirror of a light-receiving mirror assembly.
Figure 7B:
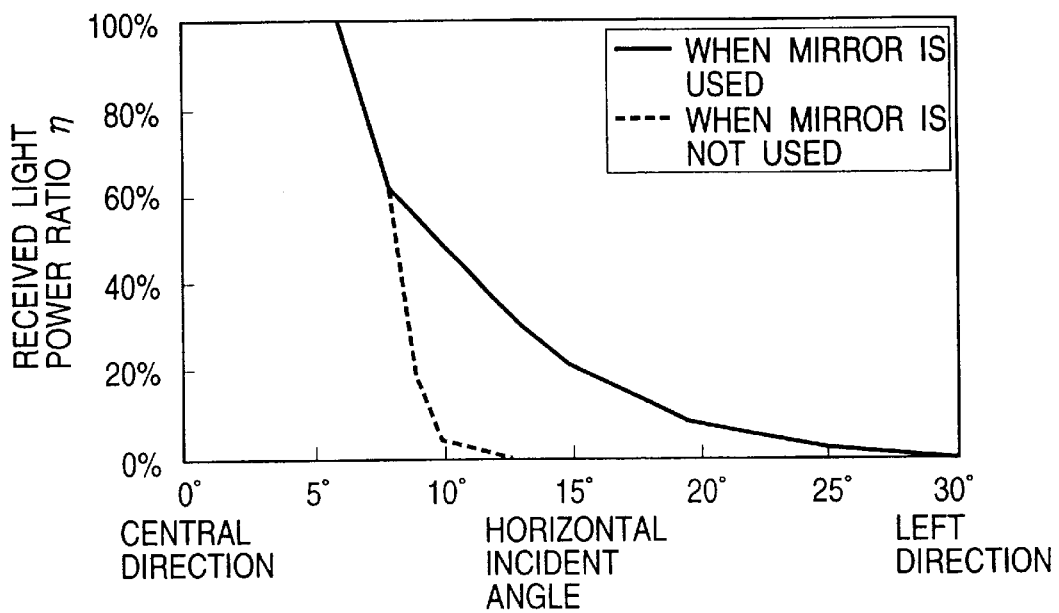
FIG. 7(b) illustrates for the case where the light enters a light-receiving lens from horizontal directions at different angles and falls on one of side mirrors of a light-receiving mirror assembly.

FIGS. 7(a) and 7(b) are graphs each of which shows a relation between a received light power ratio $\eta$ of the quantity PPD of light entering the photodiode 22 to the quantity PLZ of light entering the light-receiving lens 20 obtained by two-dimensional optical simulations. Note that the received light power ratio $\eta$ is defined by PPD/PLZ× 100(%). FIG. 7(a) illustrates for the case where the light enters the light-receiving lens 20 at different angles of $\theta$ in the vertical direction and falls on the upper mirror 23a. FIG. 7(b) illustrates for the case where the light enters the light-receiving lens 20 from horizontal directions at different angles and falls on one of the side mirrors 23b and 23c.

FIGS. 7(a) and 7(b) show that when the light enters the light-receiving mirror assembly 23 at a horizontal angle of 10° and at a vertical angle of 3° without passing through the light receiving lens 20, the received light power ratio $\eta$, as indicated by broken lines, will be approximately zero (0%), while the use of the light-receiving mirror assembly 23 increases the received light power ratio $\eta$ up to 50%. This means that the use of the light-receiving mirror assembly 23 allows the light reflected from wide-ranging directions to be focused on the photodiode 22, thereby resulting in an increase in received light power ratio $\eta$ (i.e., the sensitivity of the radar 10).

Figure 8A:
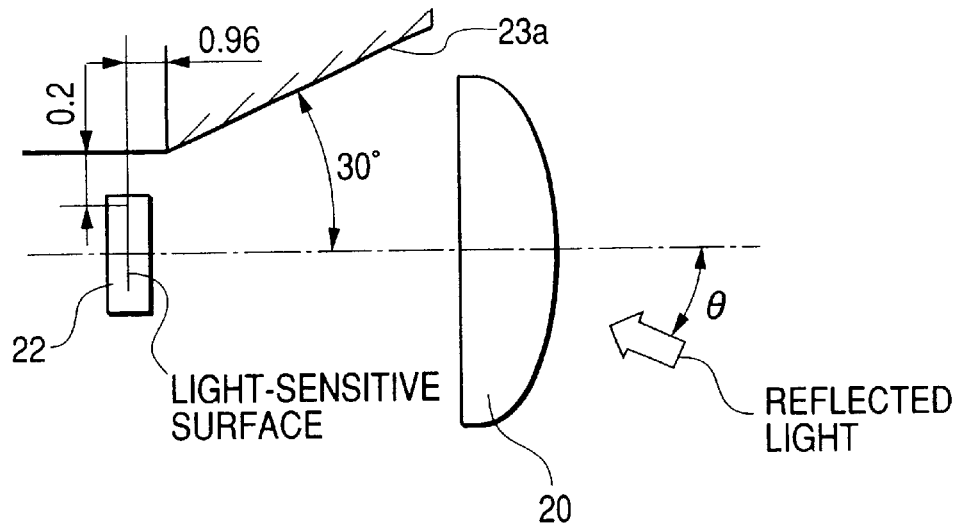
FIG. 8(a) is an illustration which shows a positional relation among a photodiode, a light-receiving lens, and an upper mirror of a light-receiving mirror assembly.
Figure 8B:
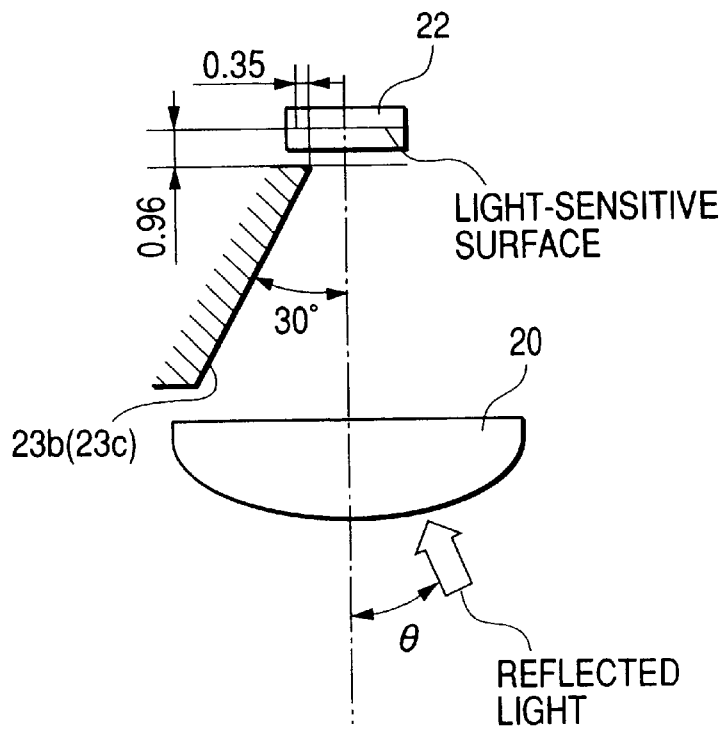
FIG. 8(b) is an illustration which shows a positional relation among a photodiode, a light-receiving lens, and a side mirror of a light-receiving mirror assembly.

The optical simulations were performed using an optical system, as shown in FIGS. 8(a) and 8(b), in which the mirrors 23a to 23c are inclined at 30° to the optical center line j, the photodiode 22 is located on the optical center line j at an interval of 0.96 mm away from the light-receiving mirror assembly 23, and the light-sensitive surface of the photodiode 22 is shifted downward 0.2 mm away from an end of the upper mirror 23a and has a length, as clearly shown in FIG. 8(b), extending horizontally outside ends of the side mirrors 23b and 23c by 0.35 mm.

Referring back to FIG. 1, the laser radar 10 also includes a drive control system consisting of an LD driver 24, a polygon scanner motor 26, a motor driver 28, a light-receiving circuit 30, a timer circuit 32, an angular position sensor 34, and an arithmetic circuit 38. The LD driver 24 is responsive to an LD drive signal SL outputted from the arithmetic circuit 38 to turn on the photodiode 12. The motor driver 28 is responsive to a motor drive signal SM outputted from the arithmetic circuit 38 to control the polygon scanner motor 26 so as to rotate the support shaft 19 of the polygon mirror 18 at a constant speed. The light-receiving circuit 30 amplifies and shapes an electric signal outputted from the photodiode 22 and outputs it as a signal SR to the timer circuit 32 and the arithmetic circuit 38. The timer circuit 32 measures a time interval between input of a start signal SS outputted from the arithmetic circuit 38 at the same time that the LD driver is turned on and output of the received light signal SR from the light-receiving circuit 30. The angular position sensor 34 monitors an angular position of the polygon mirror 18 and outputs a reference angle signal SG when the polygon mirror 18 is in a reference angular position. The arithmetic circuit 38 is responsive to input of the reference angle signal SG to provide the LD drive signal SL to the LD driver 24 to emit a laser beam through the laser diode 12 and receives the received light signal SR and a time signal ST from the timer circuit 32 to detect obstacles on the road and the lane marks printed on the road surface and estimate road conditions.

The laser radar 10 is, as shown in FIG. 2, built in a housing H and installed on a front portion of the vehicle such as a front bumper. FIG. 2 omits the LD driver 24, the motor driver 28, the light receiving circuit 30, and the arithmetic circuit 38, but in practice they are disposed on circuit boards P1 to P3 mounted on side walls of the housing H and beneath the motor driver 28.

FIG. 9 is a flowcharts of a main program performed by the arithmetic circuit 38. The program is initiated upon input of a start request signal to the arithmetic circuit 38 from the ECU 66. Before initiation of the program, the arithmetic circuit 38 outputs the motor drive signal SM to the motor driver 28 and turns the polygon mirror 18.

After entering the program, the routine proceeds to step 110 wherein a count value i which indicates one of identification numbers assigned to the mirror surfaces R1 to R6 of the polygon mirror 18, respectively, is reset to one (1). The routine proceeds to step 120 wherein it is determined whether the count value i is smaller than the number N of the mirror surfaces R1 to R6 of the polygon mirror 18 (i.e., six (6) in this embodiment) to determine which of the front zone scanning operation and the road surface scanning operation is to be performed.

If a YES answer is obtained in step 120, then the routine proceeds to step 130 wherein the arithmetic circuit 38 enters a frontal zone scanning mode and determines a laser emission time Ti of the laser diode 12 and the number Ci of laser beams to be emitted by the laser diode 12 based on a turn cycle Tcyc of the polygon mirror 18 and a beam emission interval Tp of the laser diode 12 which are predetermined so that the laser beam may scan a radar-detectable area ranging over ±8 20 if the forward direction along a longitudinal center line of the vehicle is defined as zero (0°). Alternatively, if a NO answer is obtained, then the routine proceeds to step 140 wherein the arithmetic circuit 38 enters a road surface scanning mode and determines the beam emission time Ti of the laser diode 12 and the number Ci of laser beams to be emitted in a manner similar to that in step 130 so that the laser beam may scan a radar-detectable area ranging over ±20°. The suffix "i" used in the laser emission time Ti and the number Ci of laser beams indicates one of the mirror surfaces R1 to R6 of the polygon mirror 18. The laser emission time Ti represents the time where the laser diode 12 should be turned on to emit laser beams onto the mirror surface R1 that is one of the mirror surfaces R1 to R6 of the polygon mirror 18.

Figure 10:
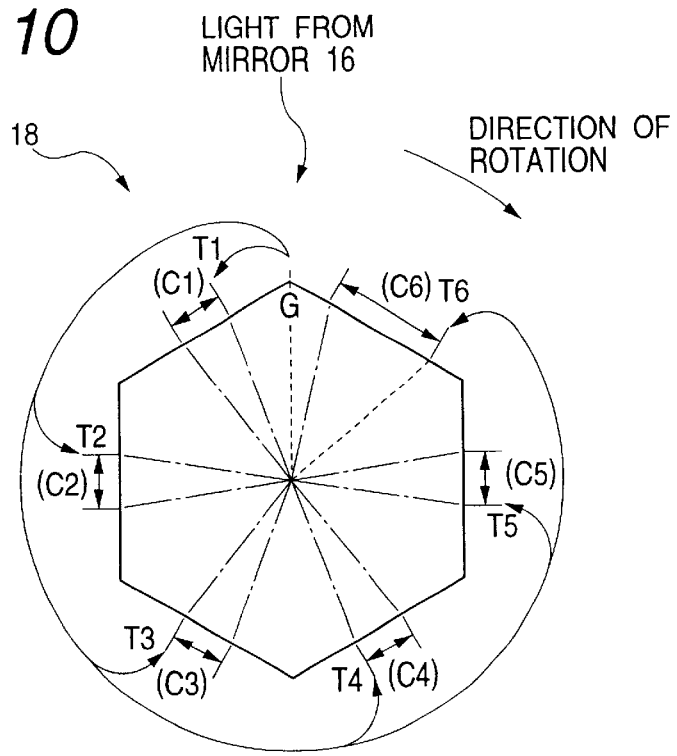
FIG. 10 an illustration which shows a relation between one of mirror surfaces of a polygon mirror and a corresponding time of start of emission of a laser beam.

Note that the reference angular position of the polygon mirror 18 in this embodiment is, as shown in FIG. 10, defined as a position where a laser beam reflected from the mirror 16 falls on a boundary G of the mirror surfaces R6 and R1, and that the beam emission time Ti is determined as a function of the elapsed time from detection of the reference angular position of the polygon mirror 18 by the angular position sensor 34.

Figure 11:
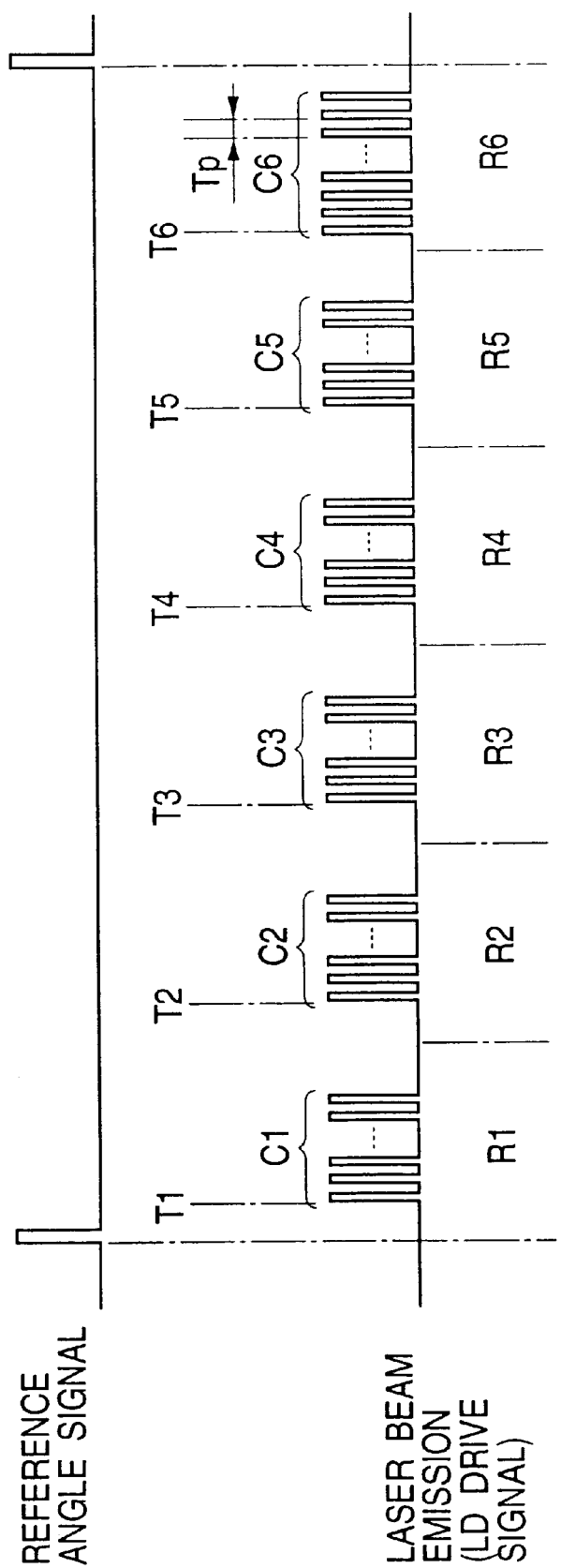
FIG. 11 is a time chart which shows the timing with which a laser diode is activated.

After steps 130 or 140, the routine proceeds to step 150 wherein a distance measuring operation is performed in the following manner. Upon reaching the laser emission time Ti, the arithmetic circuit 38 outputs, as shown in FIG. 11, as many LD drive signals SL as the number Ci of laser beams at the same time intervals as the beam emission interval Tp determined in step 130 or 140 to the LD driver 24 to activate the laser diode 12 to scan the forward radar-detectable zone. Simultaneously, the arithmetic circuit 38 outputs the start signal SS to the timer circuit 32 to start to measure the elapsed time from input of the start signal SS. When the light-receiving circuit 30 receives a return of the laser beam from an object present ahead of the system vehicle and outputs the received light signal SR to the timer circuit 32, the timer circuit 32 provides the time signal ST indicative of a time interval tsr (sec.) between input of the start signal SS and input of the received light signal SR to the arithmetic circuit 38. The arithmetic circuit 38 determines the distance L to the object in a known manner based on the time interval tsr according to a relation of $L=(tsr \cdot c)/2$ where c is the velocity of light (m/sec.).

The routine proceeds to step 160 wherein a horizontal segmentation operation is performed using distance data values derived by a scan of the laser beams over one scanning line on the mirror surface Ri of the polygon mirror 18. Specifically, adjacent two of the distance data values are compared in time sequence to collect some of them which fall within a given small distance difference range and which may be expected to arise from the same object, into one group.

The routine proceeds to step 170 wherein the count value i is incremented by one (i←i+1). The routine proceeds to step 180 wherein it is determined whether the count value i is greater than the number N of the mirror surfaces R1 to R6 of the polygon mirror 18 or not. If a NO answer is obtained, then the routine returns back to step 120. Alternatively, if a YES answer is obtained meaning that collection of data on the whole of the forward radar-detectable zone using all the mirror surfaces R1 to R6 of the polygon mirror 18 has been completed, then the routine proceeds to step 190.

Specifically, in the above steps 110 to 180, the LD driver 24 actuates the laser diode 12 to emit a laser beam in response to each input of as many LD drive signals SL as the number Ci of laser beam emissions produced by the arithmetic circuit 38 at the beam emission intervals Tp each time the laser emission time Ti is reached. The laser beams emitted from the laser diode 12 fall on the mirror surface Ri of the rotating polygon mirror 18 in sequence to scan the radar-detectable zones.

Figure 12:
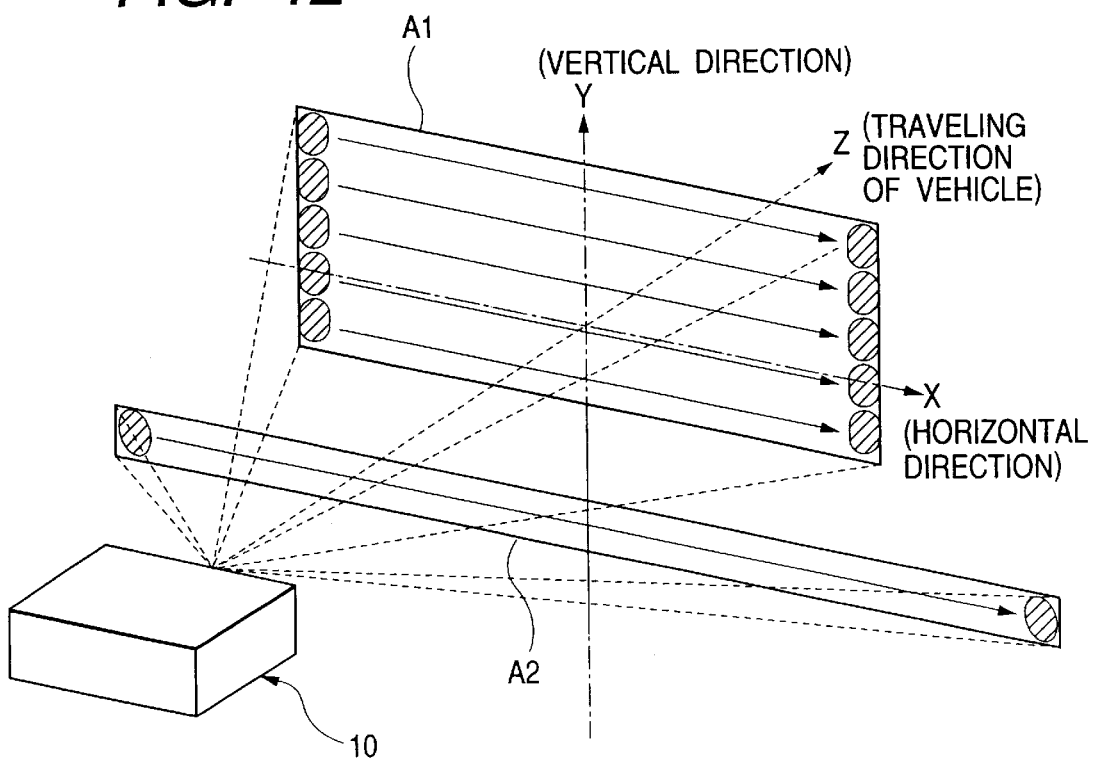
FIG. 12 is a perspective view which shows a scanning area for detecting an obstacle present ahead of a vehicle and a scanning area for detecting a lane mark printed on a road surface.

The forward radar-detectable zone, as clearly shown in FIG. 12, is made up of two areas A1 and A2. The area A1 is scanned in the frontal zone scanning operation performed using the mirror surfaces R1 to R5 of the polygon mirror 18. The area A2 is scanned in the road surface scanning operation performed using the mirror surface R6 of the polygon mirror 18. If a forward direction of the longitudinal center line of the system vehicle is defined as z-axis extending in an angular direction of 0°, the area A1 is defined two-dimensionally in a frontal view by horizontal angles of ±8° along x-axis across the z-axis, while the area A2 is defined by horizontal angles of ±20° across the z-axis. Specifically, the area A2 is wider than the area A1 horizontally, and either of the areas A1 and A2 has a minimum width required for assuring desired accuracy of radar detection of an object. This minimizes the number of emissions of laser beams, resulting in an increase in lifetime of the laser diode 12 and production of unwanted data on roadside objects having a low probability that the system vehicle will collide them.

The routine proceeds to step 190 wherein a road surface condition determining operation is performed to determine the reflectivity of the laser beam on the road surface based on the received light signal SR during the road surface scanning operation to estimate the coefficient of friction of the road surface (i.e., a dry condition).

The routine proceeds to step 200 wherein a vertical segmentation operation is performed using results of the horizontal segmentation operation in step 160. Specifically, the distance data values derived along each scanning line in the frontal zone scanning operation are arranged two-dimensionally, and adjacent two of the distance data values in a direction of y-axis are compared to collect some of them in the same manner as in step 160 which may be 10 expected to arise from the same object, into one group to detect an object present in the area A1.

The routine proceeds to step 210 wherein positional coordinates (e.g., coordinates of the central position) of the object detected in step 200 are determined. The routine proceeds to step 220 wherein the positional coordinates determined in step 210 are stored in a memory along with the distance data thereof.

The routine proceeds to step 230 wherein it is determined whether the current program cycle is the first cycle executed after input of the start request signal to the arithmetic circuit 38 from the ECU 66 or not. If a YES answer is obtained, then the routine returns back to step 110. Alternatively, if a NO answer is obtained, then the routine proceeds to step 240 wherein a lane mark data producing operation is performed based on results of the horizontal segmentation operation to determine a positional data on lane marks, usually white lines printed on the road surface. The routine proceeds to step 250 wherein an object type determining operation is performed based on the data stored in step 220 in this program cycle and a previous program cycle to determine whether an object now tracked by the laser radar 10 is a preceding vehicle traveling ahead of the system vehicle or a roadside object such as a signpost standing on the side of the road. After step 250, the routine returns back to step 110.

The positional data on the lane mark derived in step 240, the data on the road surface condition derived in step 190, and the positional and distance data on the object whose type is determined in step 250 are inputted to the ECU 66. If a preceding vehicle is being tracked by the laser radar 10, the ECU 66 uses the data from the arithmetic circuit 38 and sensor signals inputted from the throttle sensor 50, the steered angle sensor 52, and the vehicle speed sensor 54 to determine a target intervehicle distance time as expressed in time required for the system vehicle to run a target distance to the preceding vehicle and controls the brake actuator 56, the throttle actuator 58, the transmission actuator 60, and the steering actuator 62 so that the system vehicle can follow the preceding vehicle at the target distance away therefrom without going out of a traffic lane.

The data on the road surface condition is used in determining controlled variables such as a controlled brake variable etc. and target parameters such as the target intervehicle distance time etc.

Figure 13:
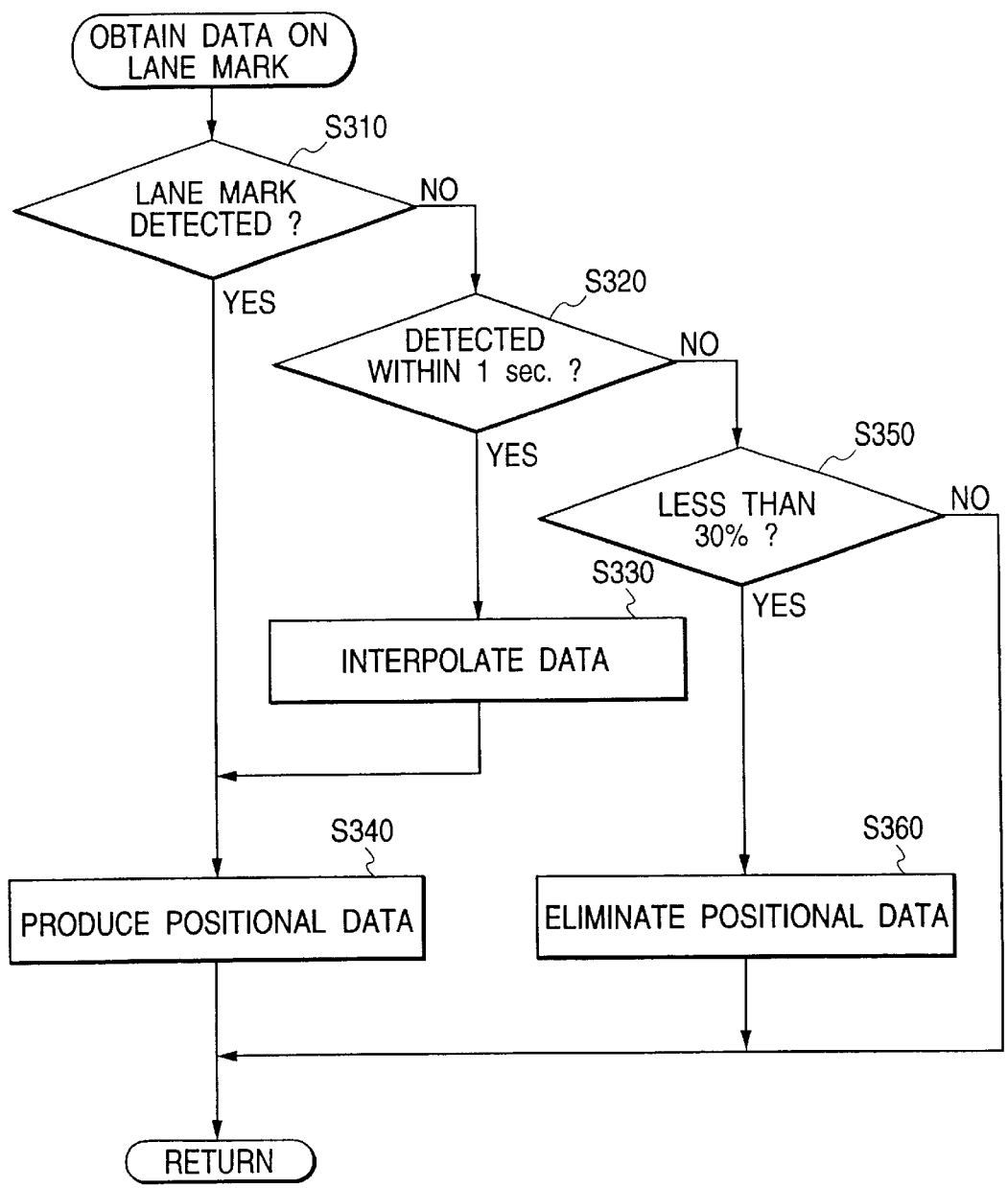
FIG. 13 is a flowchart of a program performed to detect a lane mark printed on a road surface.

FIG. 13 shows the lane mark data producing operation executed in step 240.

After entering step 240, the routine proceeds to step 310 wherein it is determined whether the lane mark is detected or not based on the results of the horizontal segmentation operation executed in step 160 during the road surface scanning operation. If a YES answer is obtained, then the routine proceeds to step 340. Alternatively, if a NO answer is obtained, then the routine proceeds to step 320.

In step 320, it is determined whether the lane mark has been detected within past one second or not. If a YES answer is obtained, then the routine proceeds to step 330 wherein a data interpolation operation is performed to set positional data on the lane mark derived using data produced by the horizontal segmentation operation in step 160 one program cycle earlier as positional data to be used in this program cycle, after which the routine proceeds to step 340.

In step 340, a flow-pass filtering operation is performed to correct the positional data on the lane mark to produce road undulation noise-compensated positional data Xc according to an equation below:

$$Xc = \alpha \cdot Xr + (1-\alpha) \cdot Xd$$

where Xr is road undulation noise-compensated positional data Xc derived one program cycle earlier, Xd is the positional data on the lane mark provided in step 330 if the lane mark is determined as not being detected in step 310 in this program cycle or the positional data on the lane mark derived using data produced by the horizontal segmentation operation in step 160 in this program cycle if the lane mark is determined as having being detected in step 310, and α is a time constant (0 <α<1).

Specifically, inclination of the laser radar 10 due to undulation of the road surface causes reflection of a laser beam from the road surface to be varied undesirably, thereby resulting in inclusion of a road undulation-caused noise in data derived by the horizontal segmentation operation. The use of the above equation eliminates a sudden change in data derived by the horizontal segmentation operation to cancel the road undulation-cause noise in the positional data on the lane mark.

If a NO answer is obtained in step 320 meaning that the lane mark has not been detected within past one second, then the routine proceeds to step 350 wherein it is determined whether the probability of detection of the lane mark in the road surface scanning operation is less than 30% or not, that is, whether the time for which the lane mark was detected within past 10 seconds is less than three seconds or not. This is because the probability of detection of a lane mark made up of a white broken line is generally more than 40%, and a determination of whether an object tracked by the laser radar 10 is a lane mark defining a traffic lane or another road sign printed on the road surface may be made by determining whether the probability of detection of the lane mark in the road surface scanning operation is less than 30% or not.

If a NO answer is obtained in step 350, then the routine terminates. Alternatively, if a YES answer is obtained, then the routine proceeds to step 360 wherein it is determined that an object tracked by the laser radar 10 is not the lane mark, and the positional data on that object is eliminated from the memory, after which the routine terminates.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, instead of the polygon mirror 18, a galvano scanner may alternatively be used which consists of a pair of reflecting mirrors: one of which orients a laser beam vertically and the second orienting the laser beam horizontally.

The mirror surface R6 of the polygon mirror 18 may alternatively be flat similar to the mirror surfaces R1 to R5.

In the road surface scanning operation, objects embedded in the road surface such as cat's-eyes may be detected instead of the lane mark.

The present invention may be used with a doze alarm system designed to monitor the position of a vehicle within a lane and alert a vehicle operator when the vehicle is going to run out of the lane due to a doze of the vehicle operator.

What is claimed is:

1. A radar apparatus for a vehicle comprising:
   a beam source mounted in the vehicle, emitting a beam of light;
   a first scanning mechanism directing the beam from said beam source forward of the vehicle so as to scan a first scanning area extending horizontally over a first angular range;
   a second scanning mechanism directing the beam from said beam source forward of the vehicle so as to scan a second scanning area extending on a road surface horizontally over a second angular range which is greater than the first angular range; and
   a light receiving mechanism receiving a return of the beam of light directed by said first scanning mechanism to detect an object present in the first scanning area and a return of the beam of light directed by said second scanning mechanism to detect a lane mark printed on the road surface to define a traffic lane.

2. A radar apparatus as set forth in claim 1, further comprising a rotary mirror rotated to change a direction of the beam of light from said beam source so as to scan the first and second scanning areas selectively, said rotary mirror having a plurality of mirror surfaces which are arranged around a periphery of the rotary mirror and which are inclined at different angles to an axis of rotation of the rotary mirror, and wherein said second scanning mechanism includes at least one of the mirror surfaces, while said first scanning mechanism includes the other mirror surfaces.

3. A radar apparatus as set forth in claim 1, wherein said light receiving mechanism includes a light sensitive surface and an upper mirror, the light sensitive surface being responsive to input of the return of the beam of light to produce a signal indicative thereof, the upper mirror being designed to direct light traveling from a lower side of a traveling direction of the vehicle to the light sensitive surface.

4. A radar apparatus as set forth in claim 1, wherein said light receiving mechanism includes a light sensitive surface and a side mirror, the light sensitive surface being responsive to input of the return of the beam of light to produce a signal indicative thereof, the side mirror being designed to direct light falling thereon from a lateral direction traversing a traveling direction of the vehicle to the light sensitive surface.

5. A radar apparatus as set forth in claim 4, wherein the side mirror is so arranged that a mirror surface faces downward.

6. A radar apparatus for a vehicle comprising:
   a beam source mounted in the vehicle, emitting a beam of light;
   a first scanning mechanism directing the beam from said beam source forward of the vehicle so as to scan a first scanning area extending horizontally over a first angular range;
   a second scanning mechanism directing the beam from said beam source forward of the vehicle so as to scan a second scanning area extending on a road surface horizontally over a second angular range;
   a light receiving mechanism receiving a return of the beam of light directed by said first scanning mechanism to detect an object present in the first scanning area and a return of the beam of light directed by said second scanning mechanism to detect a lane mark printed on the road surface to define a traffic lane; and
   a light focusing mechanism provided in said second scanning mechanism, said light focusing mechanism focusing the beam of light on a given portion in the second scanning area.

7. A radar apparatus for a vehicle comprising:
   a beam source mounted in the vehicle, emitting a beam of light;
   a first scanning mechanism directing the beam from said beam source forward of the vehicle so as to scan a first scanning area extending horizontally over a first angular range;
   a second scanning mechanism directing the beam from said beam source forward of the vehicle so as to scan a second scanning, area extending on a road surface horizontally over a second angular range;
   a light receiving mechanism receiving a return of the beam of light directed by said first scanning mechanism to detect an object present in the first scanning area and a return of the beam of light directed by said second scanning mechanism to detect a lane mark printed on the road surface to define a traffic lane; and
   a light focusing mechanism provided in said second scanning mechanism, said light focusing mechanism focusing the beam of light on a given portion in the second scanning area;
   wherein said light focusing mechanism includes a concave mirror which directs the beam emitted from said beam source so as to scan the second scanning area.

8. A radar apparatus as set forth in claim 7, wherein the second angular range is greater than the first angular range.

9. A radar apparatus for a vehicle comprising:
   a beam source mounted in the vehicle, emitting a beam of light;
   a first scanning mechanism directing the beam from said beam source forward of the vehicle so as to scan a first scanning area extending horizontally over a first angular range;
   a second scanning mechanism directing the beam from said beam source forward of the vehicle so as to scan a second scanning area extending on a road surface horizontally over a second angular range;
   a light receiving mechanism receiving a return of the beam of light directed by said first scanning mechanism to detect an object present in the first scanning area and a return of the beam of light directed by said second scanning mechanism to detect a lane mark printed on the road surface to define a traffic lane;

a light focusing mechanism provided in said second scanning mechanism, said light focusing mechanism focusing the beam of light on a given portion in the second scanning area; and a rotary mirror rotated to change a direction of the beam of light from said beam source so as to scan the first and second scanning areas selectively, said rotary mirror having a plurality of mirror surfaces which are arranged around a periphery of the rotary mirror and which are inclined at different angles to an axis of rotation of the rotary mirror, wherein said second scanning mechanism includes at least one of the mirror surfaces and said first scanning mechanism includes the other mirror surfaces.

10. A radar apparatus as set forth in claim 9, wherein said light receiving mechanism includes a light sensitive surface and an upper mirror, the light sensitive surface being responsive to input of the return of the beam of light to produce a signal indicative thereof, the upper mirror being designed to direct light traveling from a lower side of a traveling direction of the vehicle to the light sensitive surface.

11. A radar apparatus as set forth in claim 9, wherein said light receiving mechanism includes a light sensitive surface and a side mirror, the light sensitive surface being responsive to input of the return of the beam of light to produce a signal indicative thereof, the side mirror being designed to direct light falling thereon from a lateral direction traversing a traveling direction of the vehicle to the light sensitive surface.

12. A radar apparatus as set forth in claim 11, wherein the side mirror is so arranged that a mirror surface faces downward.

* * * * *